United States Patent [19]
Young

[11] Patent Number: 5,912,184
[45] Date of Patent: Jun. 15, 1999

[54] ENVIRONMENTALLY ENHANCED ENCLOSURE FOR MANAGING CMP CONTAMINATION

[75] Inventor: Christopher O'Sullivan Young, Clarkston, Ga.

[73] Assignee: Intelligent Enclosures Corporation, Norcross, Ga.

[21] Appl. No.: 08/884,585

[22] Filed: Jun. 28, 1997

Related U.S. Application Data

[60] Provisional application No. 60/020,862, Jun. 28, 1996.

[51] Int. Cl.$^6$ ...................................................... B08B 15/02
[52] U.S. Cl. ........................... 438/692; 156/345; 454/52; 454/57; 454/187
[58] Field of Search ................................... 438/690, 691, 438/692, 747; 156/345 LP; 216/38, 88, 89, 90, 91; 454/52, 57, 187, 238

[56] References Cited

U.S. PATENT DOCUMENTS

| | | | |
|---|---|---|---|
| D. 331,117 | 11/1992 | Genco | D25/138 |
| 4,542,851 | 9/1985 | Itou | 236/44 |
| 5,095,811 | 3/1992 | Shutic et al. | 454/52 |
| 5,195,922 | 3/1993 | Genco | 454/57 |
| 5,385,505 | 1/1995 | Sharp et al. | 454/238 |
| 5,401,122 | 3/1995 | Marvell et al. | 454/187 |
| 5,431,599 | 7/1995 | Genco | 454/187 |
| 5,538,471 | 7/1996 | Guiles, Jr. | 454/238 |
| 5,651,498 | 7/1997 | Meyer et al. | 236/44 |

OTHER PUBLICATIONS

Fury, Michael A., "Emerging Developments in CMP for Semiconductor Planarization," *Solid State Technology*, Apr. 1995, pp. 47–52.

Fury, Michael A., "Emerging Developments in CMP for Semiconductor Planarization—Part 2," *Solid State Technology*, Jul. 1995, pp. 81–88.

Burggraaf, Peter, "CMP: Suppliers Integrating, Applications Spreading," *Semiconductor International*, Nov. 1995, pp. 74–82.

"Semiconductor Equipment Family Description," Intelligent Enclosures Corporation Mini–Environment "How To" Series, which existed at least as early as Apr. 1993.

*Primary Examiner*—William Powell
*Attorney, Agent, or Firm*—Mitchell G. Stockwell, Esq.; Dean W. Russell, Esq.; Kilpatrick Stockton LLP

[57] ABSTRACT

An enclosure provided with an air supply system, an exhaust system, and controls for manipulating the flow, temperature, dewpoint and relative humidity of the air within the enclosure are disclosed. The present invention aims to achieve with these components a system for containing chemical contaminants created during processing of silicon wafers during the chemical/mechanical, polishing/planarization processes involved in creating those wafers. The system prevents drying of the slurry used to process wafers by controlling the relative humidity within the enclosure via a humidifier, sensors and a controller that dynamically reacts to changes within the enclosure atmosphere. Preventing slurry drying is critical to maintaining high wafer throughput by reducing gouging and scraping of wafers and also by reducing equipment down time needed to clean dried slurry. An apparatus is also provided to prevent the humidifier and control system from exceeding dewpoint within the enclosure and thereby creating excess water vapor that may interfere with the wafer creation processes. Additionally, air supply within the enclosure is controlled in order to further reduce slurry drying. Enclosures operated in accordance with the present invention preferably also prevent ambient contamination of the process area surrounded by the enclosure via physical or air flow barriers. Likewise, an enclosure according to the present invention may prevent contaminants created during the processing from escaping into the clean room surrounding the enclosure, possibly damaging equipment or harming workers.

14 Claims, 10 Drawing Sheets

Enhanced Enclosure Components

- 16 - 100% Filter Coverage
- 14 - Barrier Separates Process Area from I/O
- Polishing Platens
- 18 - Exhaust Manifolds
- 20 - Tool

Air Flow Through Wafer Pass-Through

Fig. 6

ENVIRONMENTALLY ENHANCED ENCLOSURE FOR MANAGING CMP CONTAMINATION

RELATED APPLICATION

This application claims priority to U.S. Provisional patent application 60/020,862, filed Jun. 28, 1996, and hereby incorporated in its entirety by this reference.

The present invention relates to enclosures providing environmental enhancements, like dynamic chemical exhaust, high relative humidity and dewpoint control and engineered airflow design, to properly control cross contamination, to enhance environmental conditions, to protect both product and personnel in order to thereby manage contamination from Chemical Mechanical Polishing/Planarization processes.

BACKGROUND TO THE INVENTION

Shrinking design rules, increasing numbers of metal interconnect layers, and increasing demand for planarization from deep ultra-violet ("DUV") lithography systems are spreading the use of Chemical Mechanical Polishing/Planarization ("CMP") processes throughout the microelectronics industry. CMP manufacturing applications range from microprocessors to Dynamic Random Access Memories ("DRAM"), flat panel displays and multi-chip modules. As more manufacturing processes benefit from planarization, the need and demand for integrated CMP processes grows.

A complete and integrated CMP production line consists of: a polisher, consumables, chemical distribution, cleaning systems, measurement, process isolation, environmental control and material handling systems. Providing an enclosure system that properly manages controls and enhances the process environment is critical because present CMP tools either do not provide enhanced process environments or fail to fully manage cross-contamination and environmental conditions that affect the process and the slurry.

Improperly managed slurry and CMP chemicals can be a contamination source to production. First, slurry or CMP chemicals can cross-contaminate other production processes. If wafers, carriers, boxes or personnel leave the CMP production area contaminated with chemicals or slurry, cross contamination of other fabrication areas may take place. Other chemicals used as part of the CMP process can cross-contaminate other production areas. Lithography processes, for example, using DUV photoresist require planarization. Ammonia, which is present in certain CMP applications, is a "killer" contaminant for ultra-sensitive DUV photoresist, neutralizing the photoresist acids in the ppb range. Second, the slurry used in wafer planarization makes CMP a "dirty" process. In aqueous solution, slurry particles are successfully managed for wafer polishing and planarization. Stagnant slurry and slurry particles that fall out of solution, however, can dry to a powder or even cement-like condition. Dried slurry may also cause wafer defects and low production yield. For instance, dried slurry particles can scratch and gouge wafer surfaces, eventually resulting in metal shorts after successive metal deposition.

Additionally, chemicals used in the CMP and post-CMP cleaning process can be hazardous to personnel. OSHA guidelines suggest that slurry, cleaning solutions and resulting chemical vapors used in CMP processes might pose a health risk to operators. For instance, some slurries and CMP-related chemicals may use potassium and sodium hydroxide. These strong alkali compounds can burn the skin and eyes on contact or, in their vapor form, cause eye and respiratory irritation. CMP processes may also use soluble and insoluble tungsten, which is linked to "hard metal disease" and may be lethal if ingested. Ammonia used in post-tungsten cleaning and ammonia released from other sources irritates eyes and the respiratory system and masks the odor of other gases.

CMP contamination issues also present logistical problems for integrating the CMP sector with other production areas that are more sensitive to contamination. A common practice is to separate physically with cleanroom walls the polisher from clean/dry input/output areas and metrology areas. Alternatively, stand alone polishers may be placed in gray clean room areas and a material handling strategy used to safely stage, transfer and transport wafers to and from other parts of the production line. In either case, personnel must access both the clean fabrication space and the gray CMP production areas. But this tool separation requires that personnel change garments between each area to prevent cross contamination of the clean areas of the fabrication. Resulting productivity losses greatly increase costs.

Managing environmental conditions also is important to maintaining the production readiness (uptime) of the tool, which effects the wafer throughput. Planarization rates, tool down time and maintenance activity all impact wafer throughput in the polishing process. Planarization rate is the rate at which material is removed from the wafer surface; it is affected by the slurry viscosity and the ability of the polishing pad to transport liquid and to remove excess slurry. Slurry viscosity, in turn, will be affected by the liquid content of the solution and environmental conditions. Environmental conditions include air flow rates, air turbulence, temperature and relative humidity. Dry production environments or ones with high air flow rates may tend to dry the slurry. Dried slurry buildup on tools and in delivery lines must be routinely cleaned. Clogged slurry delivery lines must be flushed and cleaned, requiring additional tool maintenance. Wet slurry may be easily rinsed away but dried and hardened slurry is much more difficult to remove.

Current designs do not solve all these problems. For instance, many CMP tool suppliers incorporate some type of enclosure or hood system to contain slurry and chemical vapors. The standard polisher tool configuration incorporates filtered air supply only to the input/output ("I/O") area to protect staged wafers with positive air pressure. The polishing process area may be kept at a negative pressure using facility exhaust to remove any chemical vapor contamination. In short, current designs only attempt to capture contamination and exhaust it. No provision is made to prevent ambient contamination from entering the process. No attempt is made to reduce slurry drying.

Those "standard" enclosure systems also are neither adequate for cross contamination control nor optimized for total control of the environmental conditions that effect tool availability wafer through-put and yield. Operating a CMP tool enclosure with negative pressure allows infiltration of contamination generated within the fabrication area into the process area and sends excessive and unnecessary volumes of air to the fabrication scrubber, thereby increasing operation costs. A polisher located in a gray area has an increased chance for contamination from the degraded environment. Macroscopic defects are typically caused by either large particles that enter the polishing chamber or large deposits of dried slurry that fall back onto a wafer in the CMP process chamber. In addition, the lack of air flow management can result in adverse air flow conditions over the polishing pads. Excessive air turbulence can lead to slurry contamination problems.

SUMMARY TO THE INVENTION

The present invention provides an optimized enclosure for managing environmental conditions during CMP processes and integrating the CMP process with the rest of the fabrication area. Components of the enclosure of the present invention include:

air flow management systems that provide low velocity, maximum laminar air flow with minimal air turbulence;

automatic valve control for balancing air supply and exhaust; and environmental controls that dynamically regulate temperature, relative humidity and dewpoint.

Laminar filtered air is supplied to the CMP tool process area at very low velocity and provides a flow path for any airborne contamination to exit the process area and be captured in the enclosure exhaust. At the same time, the low air velocity minimizes turbulence and slurry drying. Filtered air at a higher velocity and pressure is then supplied to the input/output area. So operating the enclosure with slightly positive pressure prevents infiltration of external contaminates. The pressure differential between the input/output area and the processing chamber therefore protects the staged wafers from both the ambient environment and from the chemicals and vapors in the process area. Also, operators are protected from the process chemicals in the processing chamber.

The optimized CMP enclosure of the present invention also captures and exhausts all of the chemically contaminated air. This is accomplished with precision balanced air supply, exhaust systems with variable air volume control strategically integrated into the tool enclosure, or both.

An automatic valve control maintains constant air volume within the exhaust system, eliminating the effect of air flow fluctuations in fabrication exhaust lines during operation. Automatic valve control additionally adjusts enclosure pressure during maintenance and I/O activity. The exhaust valve interlocks to the enclosure access windows to maintain appropriate conditions during operational, input, output and maintenance activities. For instance, during operational mode all access windows are closed and a minimal exhaust flow rate is needed to remove chemically contaminated air and to maintain slight positive pressure in the process area. During I/O activity, opened I/O access windows allow the I/O supply air to escape into the cleanroom. The exhaust system compensates by increasing the exhaust volume and reducing the pressure in the process area. This prevents any chemical vapor from escaping into the I/O area and into the cleanroom. Finally, during maintenance activity, access windows are opened in the process area. However, the exhaust system automatically adjusts to maintain the appropriate air volume removal for operator protection.

An optimized CMP enclosure of the present invention manages and controls environmental conditions that affect CMP processes. Relative humidity has been found to have the greatest effect on the slurry drying rate. Maintaining environmental conditions between about 70% (or lower) and 100% relative humidity helps prevent dried slurry and associated problems. Maintaining the CMP process at this humidity level reduces the slurry drying that otherwise contaminates the CMP enclosure (requiring expensive clean up and maintenance activities) and possibly cross-contaminates the fabrication area. Because slurry delivery lines frequently clog, a high humidity, controlled enclosure system may eliminate or at least reduce such clogging. This is done preferably with a steam humidifier, but can also be done with an ultra-sonic, infrared or other appropriate humidifier.

Such high humidity environmental control also requires conditioning the air temperature to avoid reaching dewpoint conditions within the enclosure system. This can be accomplished without expensive HVAC systems, however. Coolant coils are run at a fixed capacity to cool air. A heating element may then be used as needed to adjust the air temperature to the optimum level. The coolant coils, humidifier and heating element may be controlled by a computer, coupled to temperature and humidity sensors located within the enclosure (or duct work coupling to the enclosure). This design offers both quicker response time and cost savings over expensive HVAC equipment.

It is accordingly an object of the present invention to provide an enclosure for use with CMP processing.

It is an additional object of the invention to control the environment within the enclosure to optimize temperature, pressure and relative humidity in order to minimize contamination caused by CMP processing.

It is yet another object of the invention to prevent the environment within the enclosure from reaching dewpoint.

Other objects, features and advantages of the present invention will become apparent upon reading the remainder of this document.

DETAILED DESCRIPTION OF THE DRAWINGS

Figure 1:
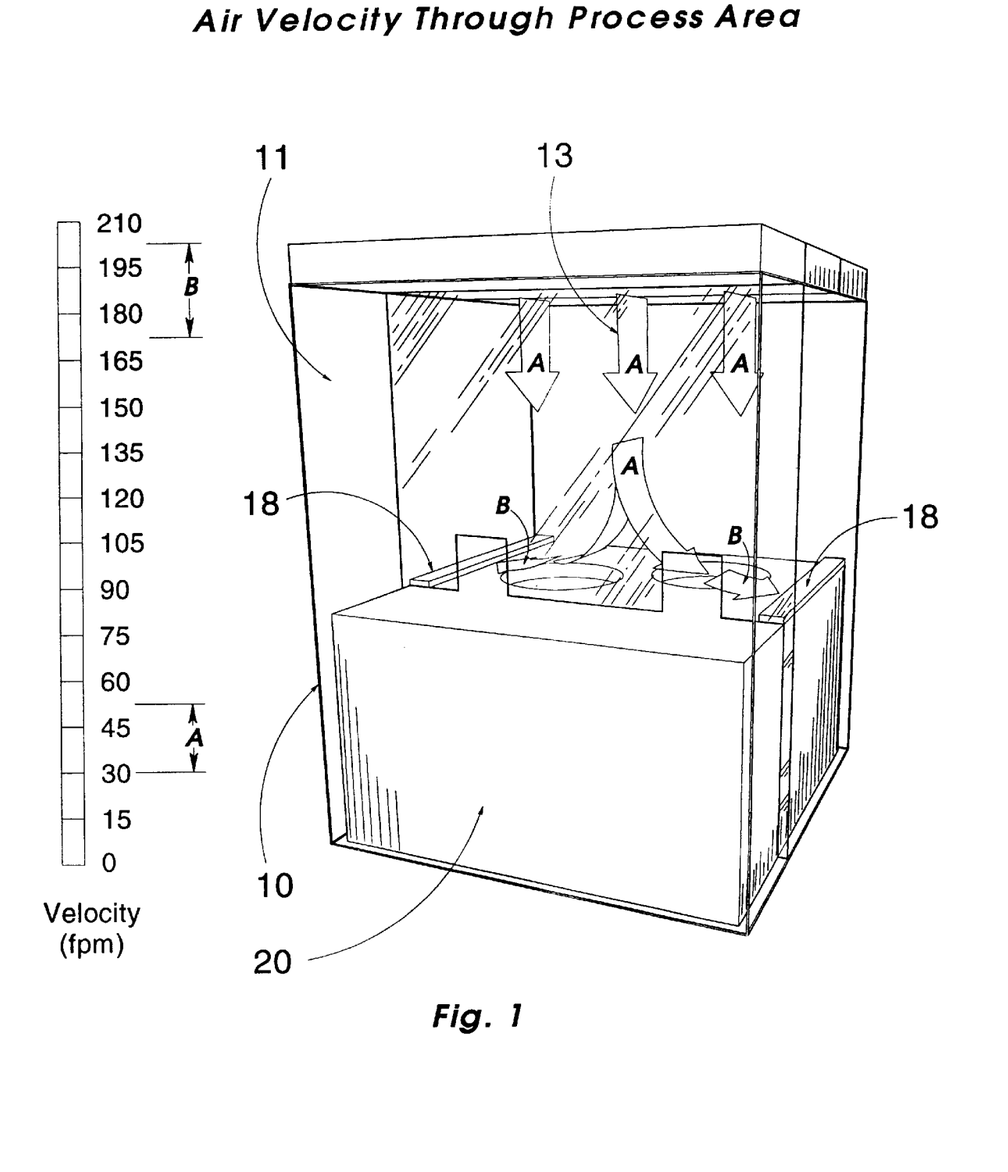
FIG. 1 shows air flow through an enclosure of the present invention surrounding a CMP process area.

Enclosure 10 shown in the Figures circulates air or other fluid flows 12 past the CMP process equipment 20. As shown in FIG. 1, air flow 12 is generally laminar. That generally laminar air flow 12 is provided by supply plenums, ducts, dampers, grills, air valves, hollow doors or covers or other appropriate equipment. Such air delivery equipment is described in U.S. Pat. Nos. Des. 331,117, 5,195,922, 5,401, 122 or 5,431,599, each of which is owned by the assignee of the present invention and hereby incorporated in its entirety by this reference.

Although maximum uniform or laminar air flow is aimed for, convergence of air flows 12 around the CMP equipment 20 causes some turbulence. An input/output ("I/O") area 11 prevents the turbulent air flows 12 from carrying particles or fumes generated during operation of the CMP equipment 20 out of the enclosure 10. The I/O area 11 additionally prevents ambient air from entering the enclosure 10. An I/O area 11 may be fashioned with a full or partial physical barrier or even a "curtain" of air 13 flowing slightly faster than the air flows 12 within the enclosure 10. For example, a physical barrier 14, as shown schematically in FIG. 3, may be made partial by providing a mechanized window within the barrier 14 to allow input of workpieces into the enclosure 10.

Figure 3:
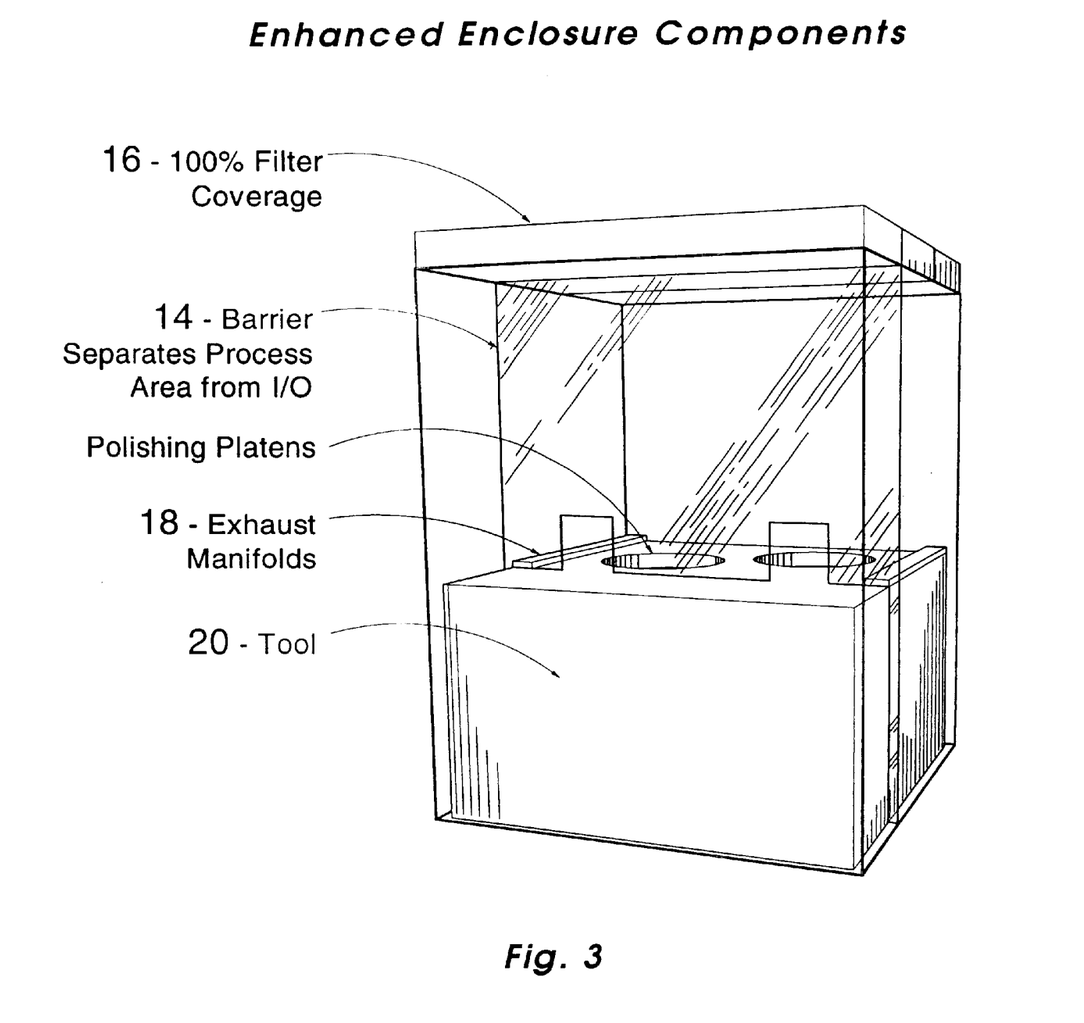
FIG. 3 shows the pressure contours in an enclosure of the present invention.
Figure 4:
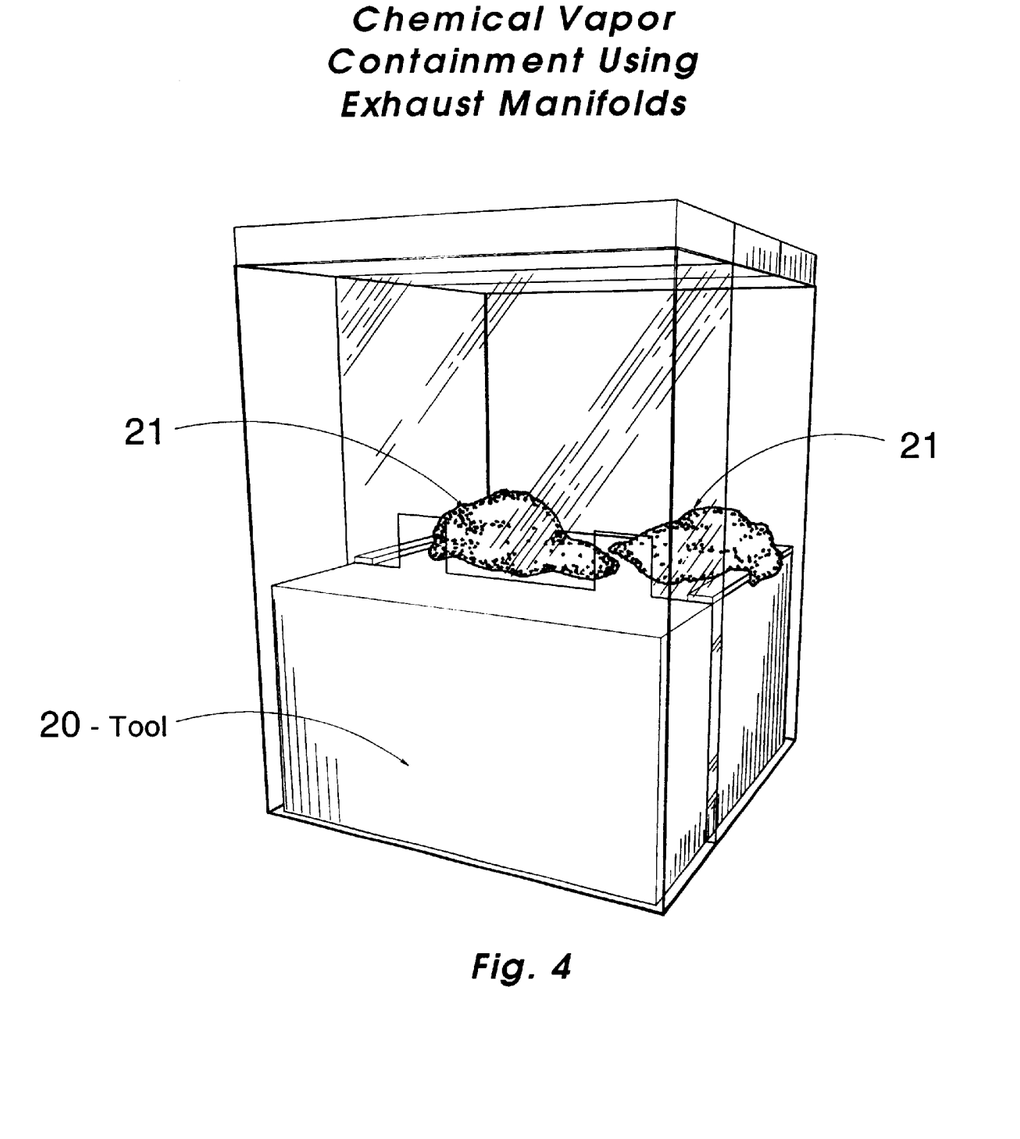
FIG. 4 shows the enclosure of the present invention configured to contain chemical vapors using exhaust manifolds.
Figure 5:
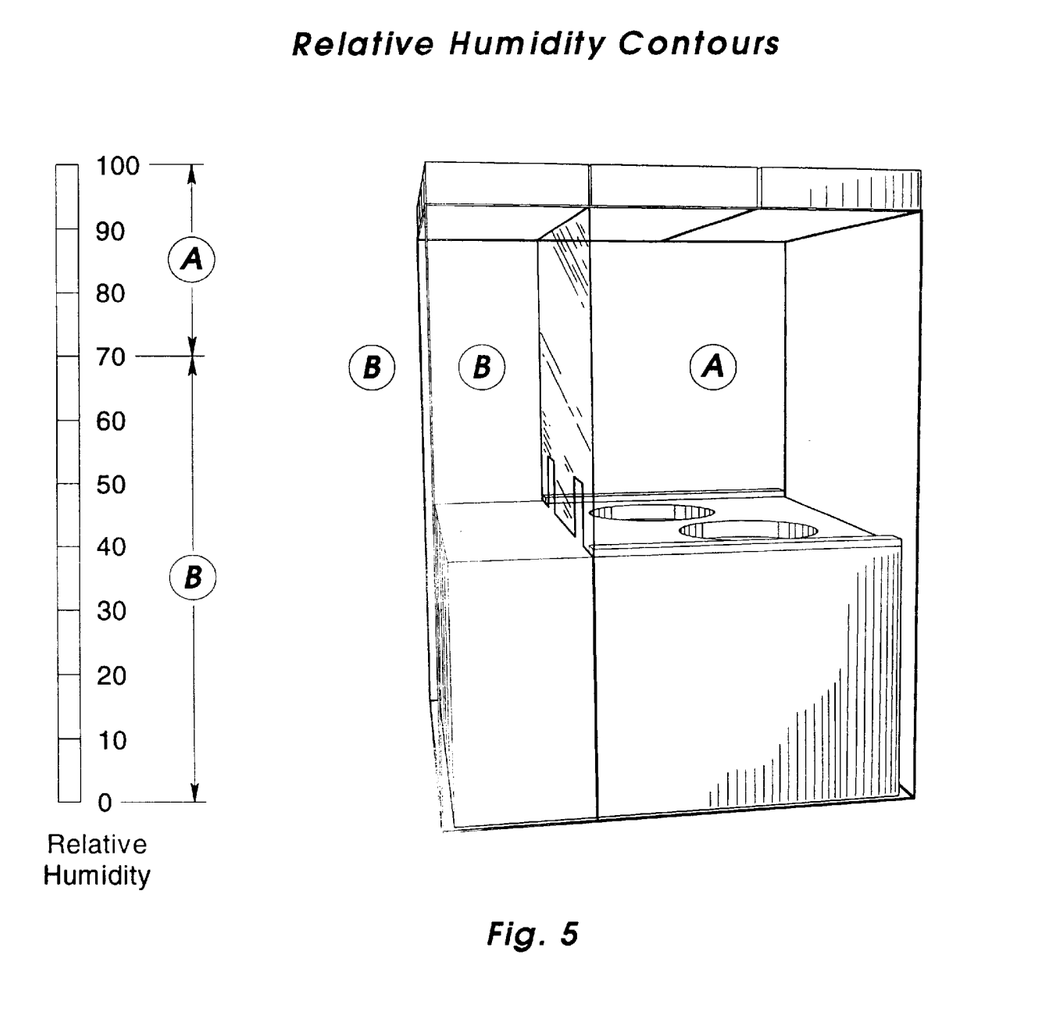
FIG. 5 shows the relative humidity contours in an enclosure of the present invention.
Figure 6:
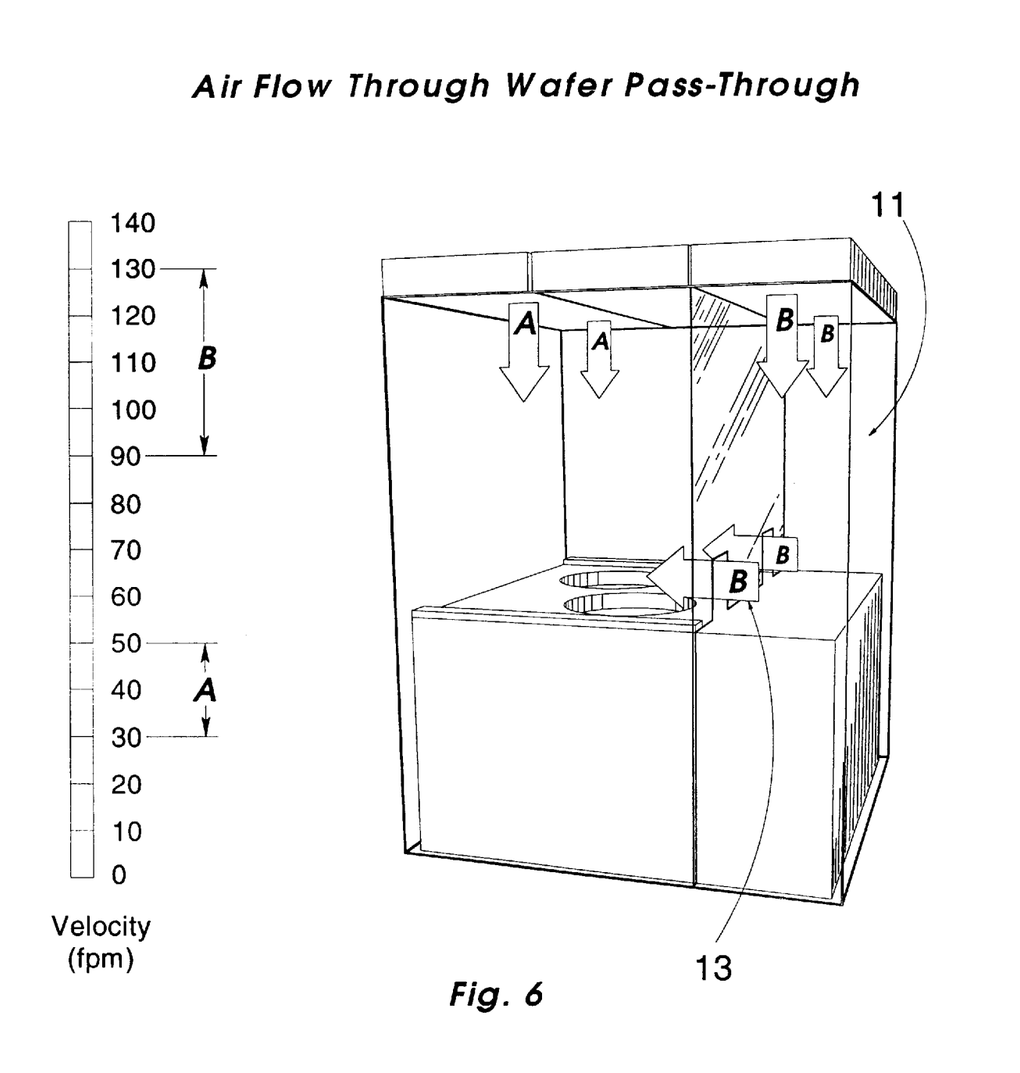
FIG. 6 shows air flow through wafer pass-through in an enclosure of the present invention.

In addition to providing generally laminar air flows 12, the enclosure 10 of the present invention has equipment for filtering and controlling the temperature, relative humidity and dewpoint characteristics of air flows 12. For instance, FIG. 3 shows that filter 16 provides full coverage of air entering the enclosure 10. Filter 16 may be a HEPA, ULPA or other appropriate filter. Additionally, if hollow covers or walls deliver a horizontal air flow, as described in U.S. Pat. No. 5,401,212, filter 16 may be positioned in the hollow covers or walls. In any event, filtered air flows 12 move through the enclosure 10 and exit via exhaust manifolds 18. Those manifolds 18 may be positioned to maximize containment of chemical vapors 21 generated through use of typical CMP equipment 20, as FIG. 4 shows. While filtered air flows 12 could be recirculated, refiltered and directed back into the enclosure 10, chemicals normally associated with CMP processing typically lower the amount of air that can be economically so recirculated.

The present invention also conditions air flows 12 to control relative humidity within the enclosure 10, as FIGS. 2B–E and 5 show schematically. In a typical embodiment, a blower pushes or pulls air into the enclosure 10. Air flows 12 move through a plenum (not shown) and past a humidifier 33 device. Such a device could be: (1) a steam humidifier that essentially boils water in a reservoir and then regulates release of steam into the air to adjust relative humidity; (2) an ultrasound humidifier that uses a transducer to produce tiny droplets distributed into the air; or (3) an infrared quartz light that evaporates water from a reservoir into the surrounding air. Other humidifier 33 devices may also be used and positioned anywhere within the enclosure 10 for effective air treatment.

One problem with maintaining a high, from about 70% to 100%, relative humidity is that the moisture in the air may condense when dewpoint is reached. FIGS. 2B–E schematically show equipment to control air temperature and prevent dewpoint conditions. A cooling coil 32, carrying water or a manufactured refrigerant, cools air entering the temperature control area 30. A heating element 34, which may be a simple resistive heater, may also be provided.

Typically, operating cooling coil 32 at a set cooling capacity provides the best temperature control over the entering air flows 12. Air flows 12 may range in temperature depending on the ambient environment. But the cooling capacity can be set to operate at a capacity sufficient to cool below dewpoint even air flows 12 at the high temperature end of the expected ambient temperature range. Then, for air flows 12 at the low temperature end of the expected ambient temperature range, the heating element 34 may be used to adjust the temperature up. Setting the cooling coil 32 to run at a constant capacity avoids the need constantly to change the amount and pressure of coolant flowing through the coil 32. While the present invention could change the coolant capacity to prevent dewpoint conditions in the enclosure 10, this process takes longer and therefore decreases the reaction time of the system, possibly leading to dewpoint and resulting condensation.

This arrangement of simple cooling coil 32 and heating element 34 provides efficient, cheap and responsive dewpoint temperature control. Responsiveness can be further improved by automating control of the cooling coil 32 and heating element 34. This can be done by coupling any conventional, properly programmed microprocessor or computer controller 36 to the cooling coil 32 and heating element 34. Inputting information from temperature 61, humidity 62 and pressure 60 sensors into the computer 36 allows the computer 36 to calculate the dewpoint at that humidity level. Based on the temperature reading, computer 36 then controls cooling coil 32, heating element 34 and the steam, ultrasound, infrared or other humidifier 33 in order to maintain a high relative humidity but prevent dewpoint.

Computer 36 may also be configured to provide dynamic control over chemical exhaust and incoming air. Typically, dynamic control over air flows 12 is provided with:

a variable exhaust valve coupled to a fixed air supply;

a fixed exhaust valve coupled to a variable air supply; or both a variable exhaust valve and variable air supply.

Assuming pressures within an enclosure 10 have reached a steady state condition, a number of acts will disrupt steady state. For instance, opening an access window or door 15 in a physical barrier between enclosure 10 and an I/O area 11, opening a door 17 between the I/O area and ambient environment or even moving product through a window 15 into the CMP equipment 20 area disturbs the steady state condition. This causes fluctuations in air flows 12. Dynamic control over air flows 12 to compensate for the change in enclosure 10 conditions then becomes necessary.

Figure 2A:
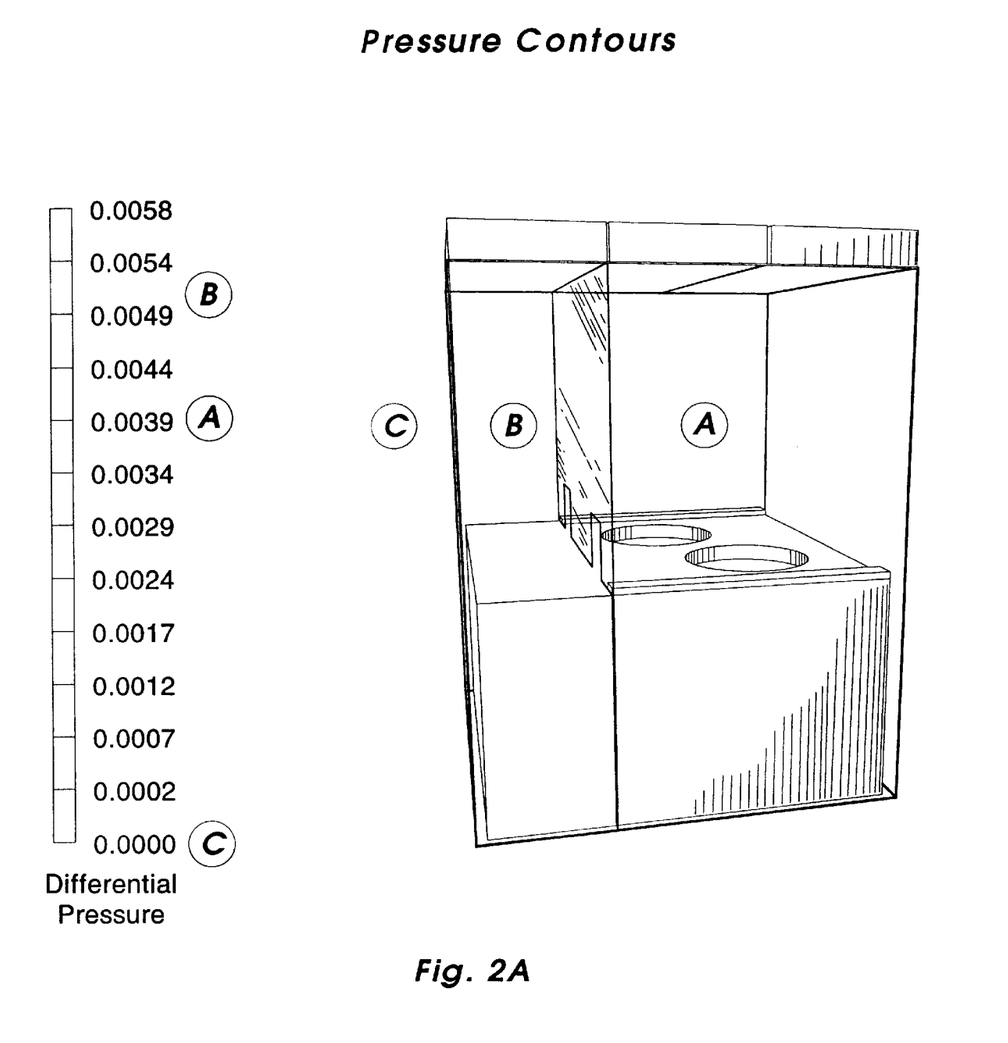
FIGS. 2A–E show various configurations of an enclosure of the present invention provided with equipment and controls for regulating the environment within the enclosure.
Figure 2B:
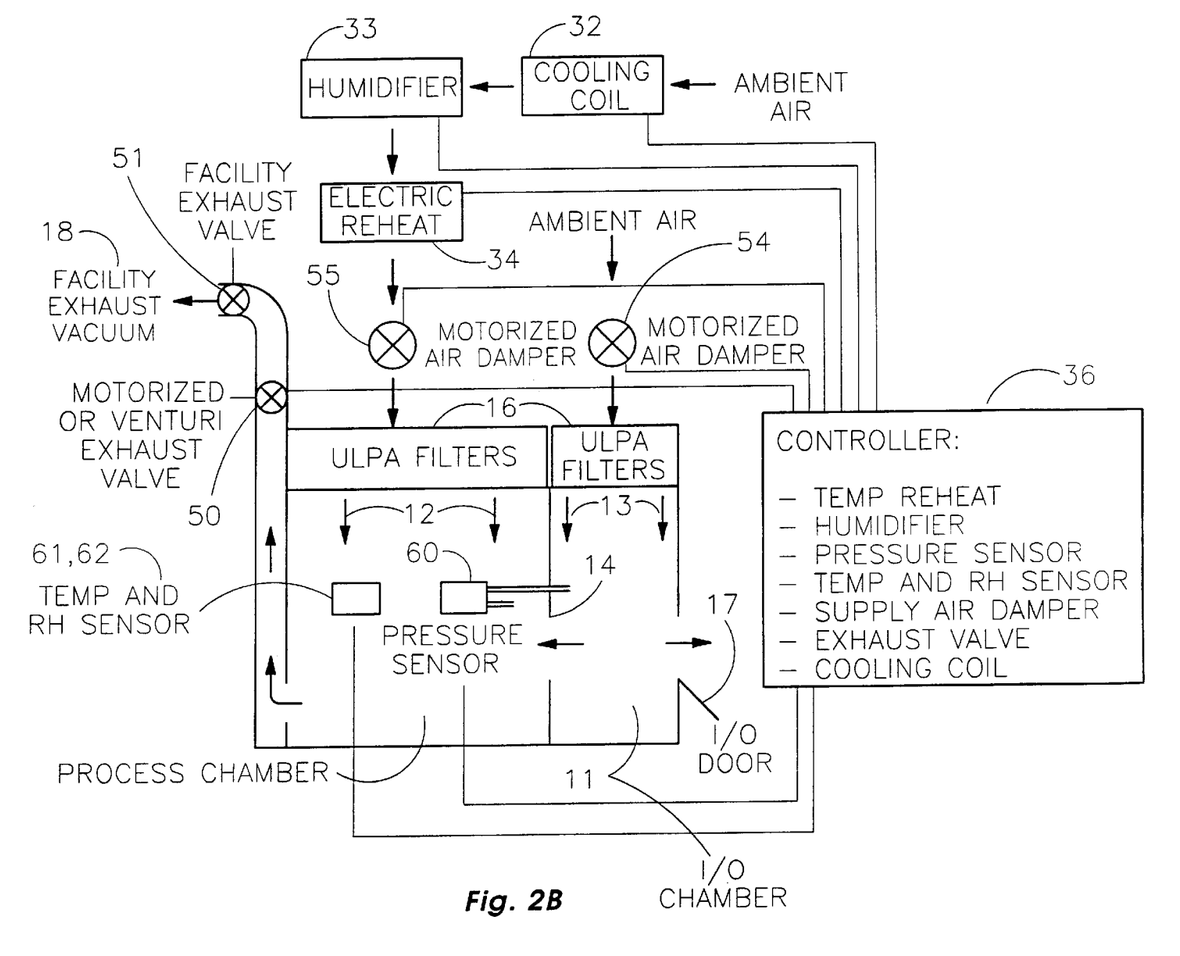
Figure 2C:
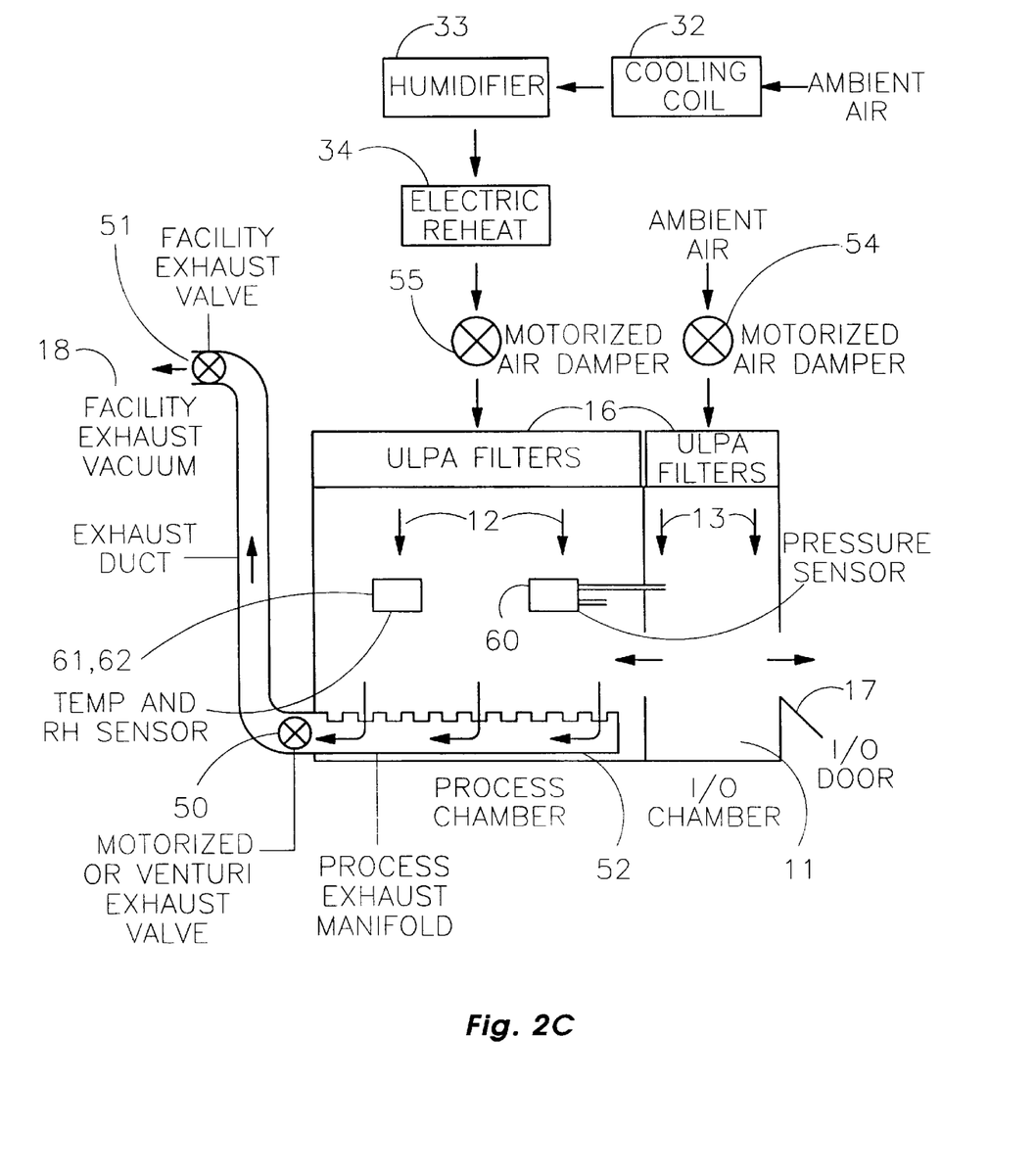
Figure 2D:
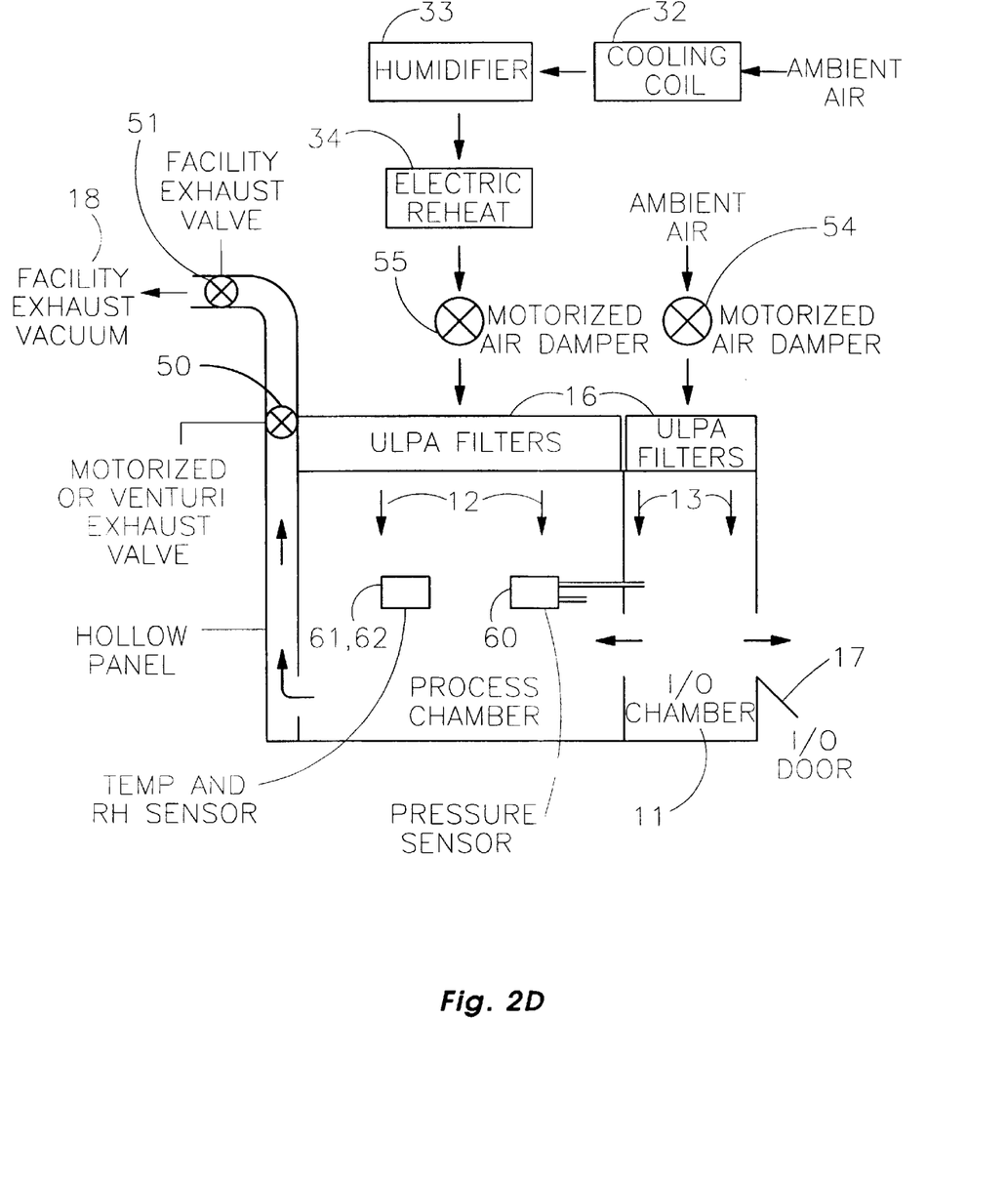
Figure 2E:
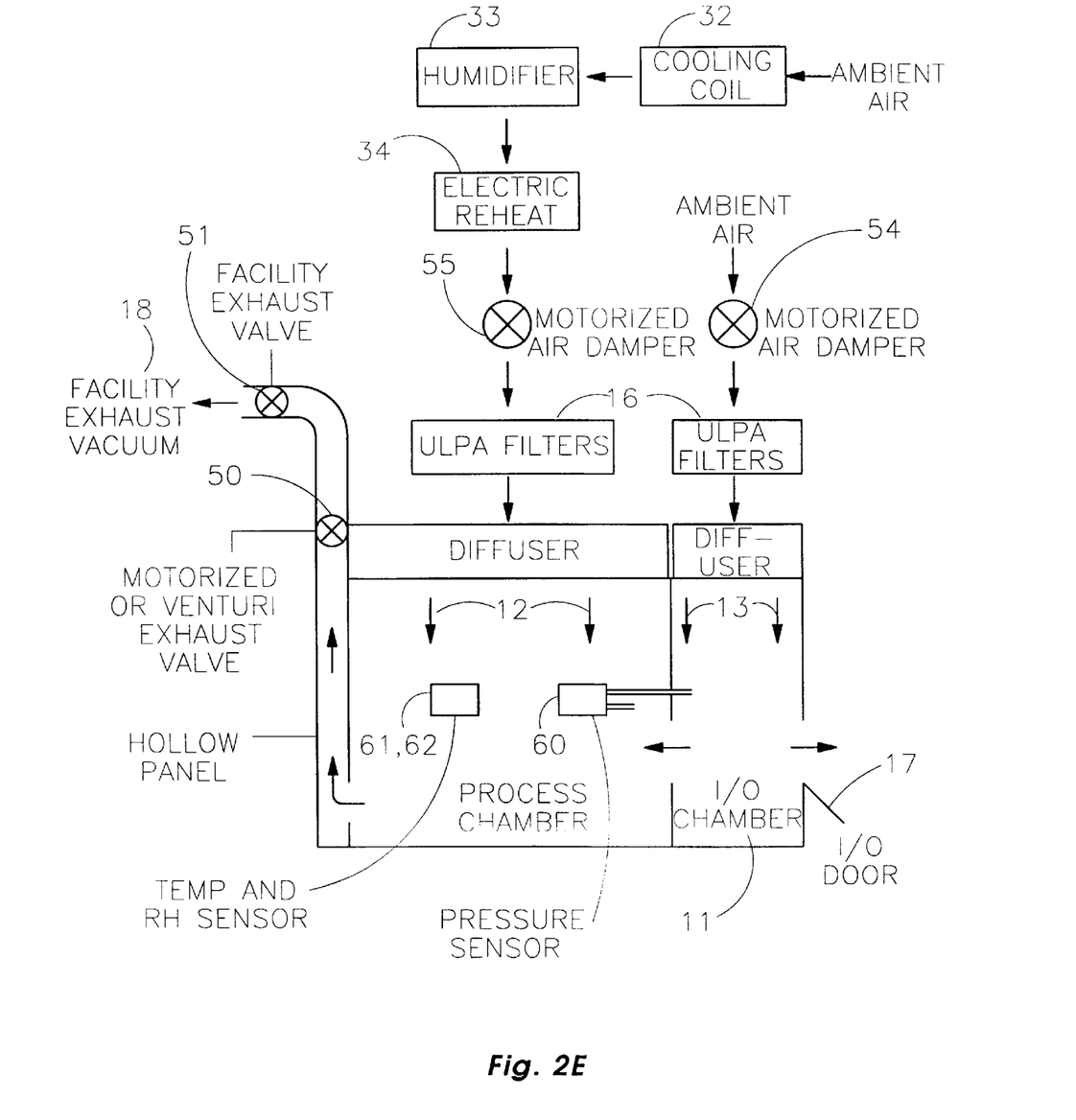

Such dynamic control can be provided by an appropriate combination of the above-described valves and variable air supplies. For instance, one embodiment of dynamic air control in a simple enclosure 10 may use a two-position exhaust valve 50, as shown in FIG. 2B. The first valve position is used at steady state conditions. However, when a door 17 or window 15 opens, a switch-activated sensor actuates a solenoid or other device to open the valve 50 to its second position, increasing exhaust volume 18 through a manifold 52. The resulting pressure decrease within the enclosure 10 prevents contaminants from migrating out. Indeed, both the exhaust valve 50 and air supply may be dynamically and automatically controlled. (But barrier 14 or a curtain of faster air flows 13 prevents particles from migrating into the enclosure 10). By setting the second position to maximum exhaust, workers entering the processing area inside enclosure 10 are protected since most dangerous chemical fumes 21 will be drawn out of the enclosure 10. Another embodiment may use pressure sensors 60 to sense changes within the enclosure 10. Coupling pressure sensors 60 to the computer 36 allows automated control over a motorized valve 50 that provides finer control over exhaust volume. Alternatively, instead of controlling the exhaust valve 50, air supply equipment may be controlled (e.g., by controlling blower output or motorized air dampers 54, 55) to increase or decrease the velocity of the air flows 12, 13.

Air exiting the facility exhaust valve 51 may be recirculated, routed to the ambient environment or, as is most likely in CMP processes involving hazardous chemicals, routed to chemical scrubbers. Exhaust manifolds 52 that lead to the exhaust valve 50 may take the form of exhaust lips located near the CMP equipment 20 in order to capture the most chemically laden air and, because of their location near turbulent air flow areas, to remove air and thereby smooth the air flows 12. If desired, such highly fume-laden air may be routed directly to scrubbers rather than being mixed with other, less fume-laden air from the enclosure 10. That other air may then be routed through a filter 16 and/or scrubber and then recirculated into the enclosure 10. Recirculation may occur through hollow covers or walls to the enclosure 10, as described in U.S. Pat. No. 5,401,212.

By way of example, and without limiting the invention, an enclosure 10 may be operated at the following specifications:

|  | I/O Area | Process Area |
| --- | --- | --- |
| Air Velocity | 40–90- FPM | 30–70 FPM |
|  | (+/−2 FPM) | (+/−2 FPM) |
| Pressure | .002–.01" H2O | .0015–.01" H2O |
|  | (+/−.003" H2O) | (+/−.0003" H2O) |
| Cleanliness | Class 1 | Class 1 |
| Isolation Factor | 100,000 | 100,000 |
| Particle Recovery | 30–90 seconds | 90 seconds |
| Relative Humidity | N/A | 70–95% RH |
|  |  | (+/−.5% RH) |
| Humidity Recovery | N/A | 100 seconds |
| Exhaust | N/A | 400–1200 CFM |

These conditions assist in preventing slurry drying and buildup within the polishing chamber to further enhance throughput and yield by reducing (1) wafer scratching and gouging and (2) equipment maintenance. The specifications described above may be achieved by equipping an enclosure with a humidifier, dewpoint control systems or air flow and velocity systems, and dynamically operating those components in accordance with the method of the present invention.

The foregoing is provided for purposes of explanation and disclosure of preferred embodiments of the present invention. Modifications and adaptations to the described embodiments will be apparent to those skilled in the art and may be made without departing from the scope or spirit of the invention and the following claims.

What is claimed is:

1. An enclosure surrounding equipment for processing a workpiece, the enclosure comprising:
    a. means for supplying air flow to the interior of the enclosure;
    b. means, associated with the supply means, for adjusting the relative humidity of the air flow;
    c. a controller, coupled to the adjusting means, for dynamically controlling the relative humidity within the enclosure; and
    d. means for preventing dewpoint from being reached within the enclosure.

2. The enclosure of claim 1 further comprising means for dynamically adjusting the pressure within the enclosure and in which the controller is further coupled to multiple sensors located within the enclosure for determining the environmental conditions within the enclosure, wherein the controller is adapted to dynamically adjust the pressure, temperature and relative humidity of the air flows in response to the sensors.

3. The enclosure of claim 1 in which the preventing means comprises:
    a. a temperature and humidity sensors, located within the enclosure and coupled to the controller;
    b. a cooling coil associated with the enclosure; and
    c. an air heater associated with the enclosure and coupled to the controller.

4. The enclosure of claim 3 in which the cooling coil is coupled to and controlled by the controller.

5. The enclosure of claim 1 further comprising means, associated with the supplying means, for adjusting the velocity of the air flow supplied to the interior of the enclosure.

6. The enclosure of claim 1 further comprising:
    a. a process chamber associated with an input and output area;
    b. means for supplying positive pressure to the input/output area; and
    c. an air supply system associated with the enclosure, the system comprising at least one fan and a plurality of filters.

7. The enclosure of claim 6 further comprising an adjustable exhaust valve adapted to prevent contaminants from escaping the enclosure.

8. The enclosure of claim 7 in which the controller couples to the exhaust valve in order to dynamically control exhaust and enclosure pressure.

9. The enclosure of claim 8 in which the controller couples to a pressure sensor.

10. A method for operating an enclosure surrounding CMP processing equipment, the method comprising the steps of:
    a. providing a generally laminar air flow;
    b. treating the air to raise its relative humidity level to between about 70% to 100% relative humidity; and
    c. controlling the air temperature to prevent moisture within the air from condensing.

11. A method according to claim 10 further comprising the step of generally isolating the enclosure from an ambient environment to prevent influx of contaminants.

12. A method according to claim 11 in which the prevention step comprises the steps of isolating the processing area from the input/output area via an air supply system adapted to create differential pressure between the processing area and the input/output area.

13. A method according to claim 11 further comprising the step of preventing chemical vapors from escaping the enclosure.

14. A method according to claim 13 in which the preventing step comprises the step of dynamically controlling the pressure within the enclosure via an adjustable exhaust system, sensors and a controller.

* * * * *